Figure 1:
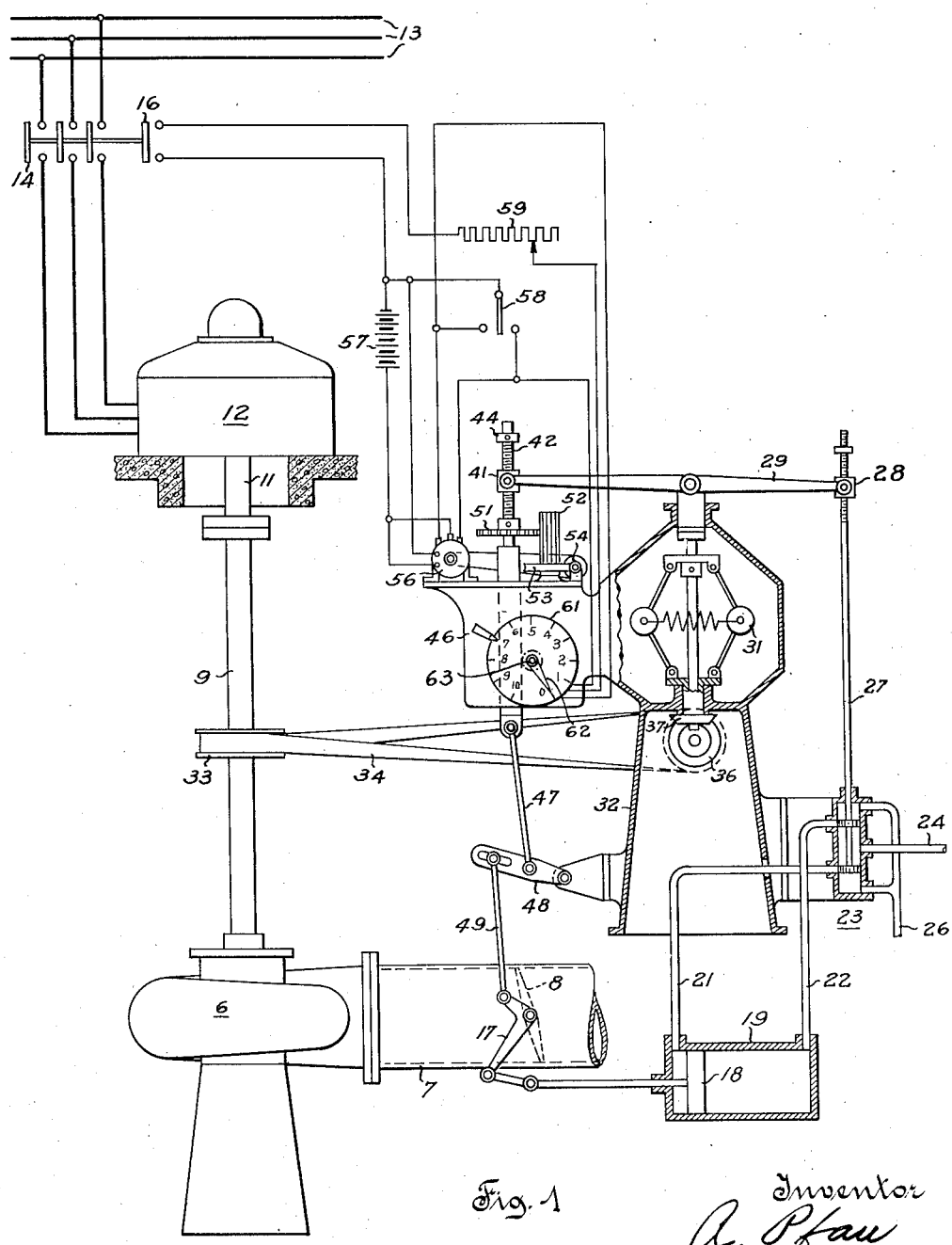

Nov. 3, 1936.     A. PFAU     2,059,651
PRIME MOVER CONTROL SYSTEM
Filed Sept. 20, 1935     3 Sheets-Sheet 2

Inventor
A. Pfau
by
Attorney

Nov. 3, 1936.  A. PFAU  2,059,651
PRIME MOVER CONTROL SYSTEM
Filed Sept. 20, 1935  3 Sheets-Sheet 3

Inventor
A. Pfau
by G. P. Delvin
Attorney

Patented Nov. 3, 1936

2,059,651

UNITED STATES PATENT OFFICE 2,059,651

PRIME MOVER CONTROL SYSTEM

Arnold Pfau, Milwaukee, Wis., assignor to Allis-Chalmers Manufacturing Company, Milwaukee, Wis., a corporation of Delaware Application September 20, 1935, Serial No. 41,368

13 Claims. (Cl. 290—4)

This invention relates to improvements in systems for controlling the operation of prime movers and more particularly to the control of prime movers driving electric generators which are to be connected with a power line in parallel with other generators.

When a plurality of alternating current electric generators which are separately driven by prime movers, are to be connected to a common transmission power line, it is necessary that such prime mover generator units be provided with control systems for the purpose of bringing such units up to the speed at which they may be connected to the line when such line is already energized by other units. After such connection, the units must be kept up to the proper speed to maintain the frequency of the line and the proper load distribution must also be maintained between the several units supplying such line. Heretofore variations of several cycles, plus or minus, from the base frequency were permissible and such variations could be continued for a sufficient length of time to permit a unit to be started from standstill and to be connected with the line upon the attainment of proper speed to then assist in bringing the frequency of the line back to the desired normal frequency. With the increase in use of devices dependent on maintenance of an exact frequency for their proper operation, such as for example time pieces, such variation from the normal frequency is no longer tolerable.

It is therefore among the objects of the present invention to provide a control system for prime movers operating alternating current generators connected in parallel with other similar generators in which system the generating unit will be controlled to operate either as a generator or as a synchronous condenser dependent on whether or not load is required of such unit.

Another object of the invention is to provide a prime mover driven electric current generating unit which is so controlled as to be capable of picking up or rejecting load with the least possible speed drop or increase in the system with which the unit is connected.

Another object of the invention is to provide a control system for prime movers driving alternating current generators in parallel with other generators in which the unit may be operated in such manner as to be in readiness for instantaneously supplying power to the common transmission line.

Another object of the invention is to provide a control system for a prime mover generating unit in which the system controlling the unit when connected with the line, will maintain such unit at the proper speed without drawing current from the line and without being subject in any material degree to hunting.

Another object of the invention is to provide a control system for prime mover generator units in which the speed of operation of the unit will be positively limited to a predetermined value.

Figure 2:
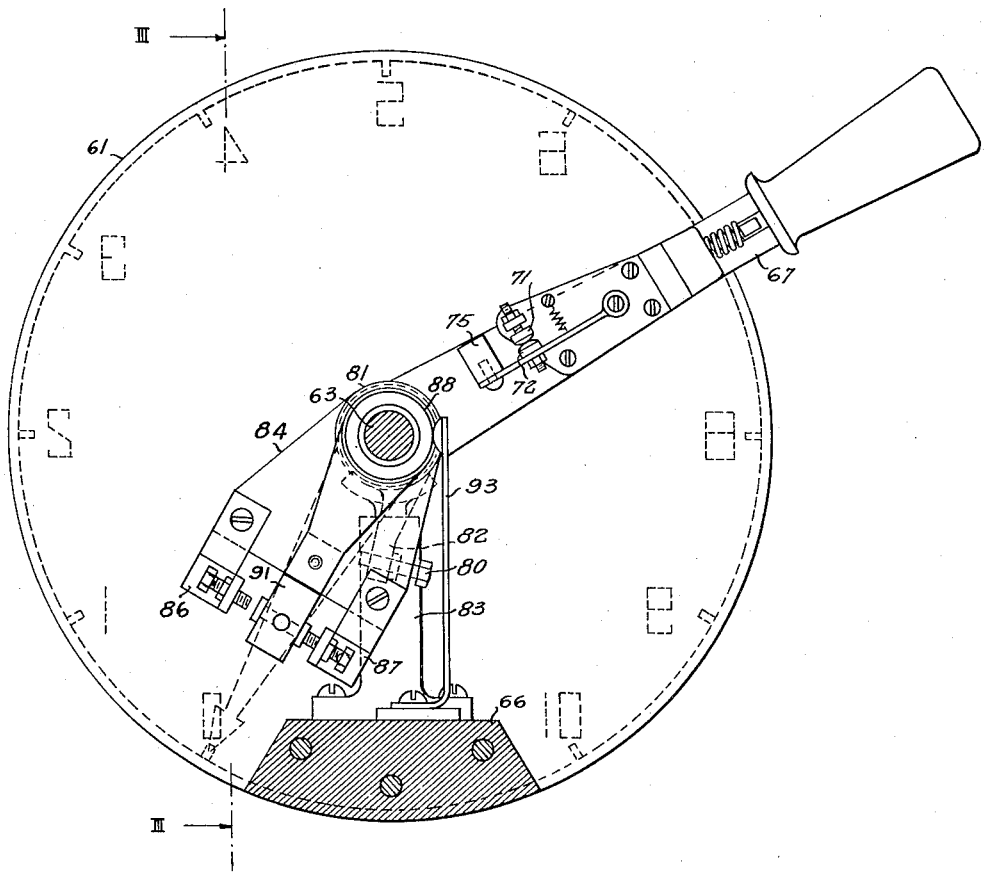
Figure 3:
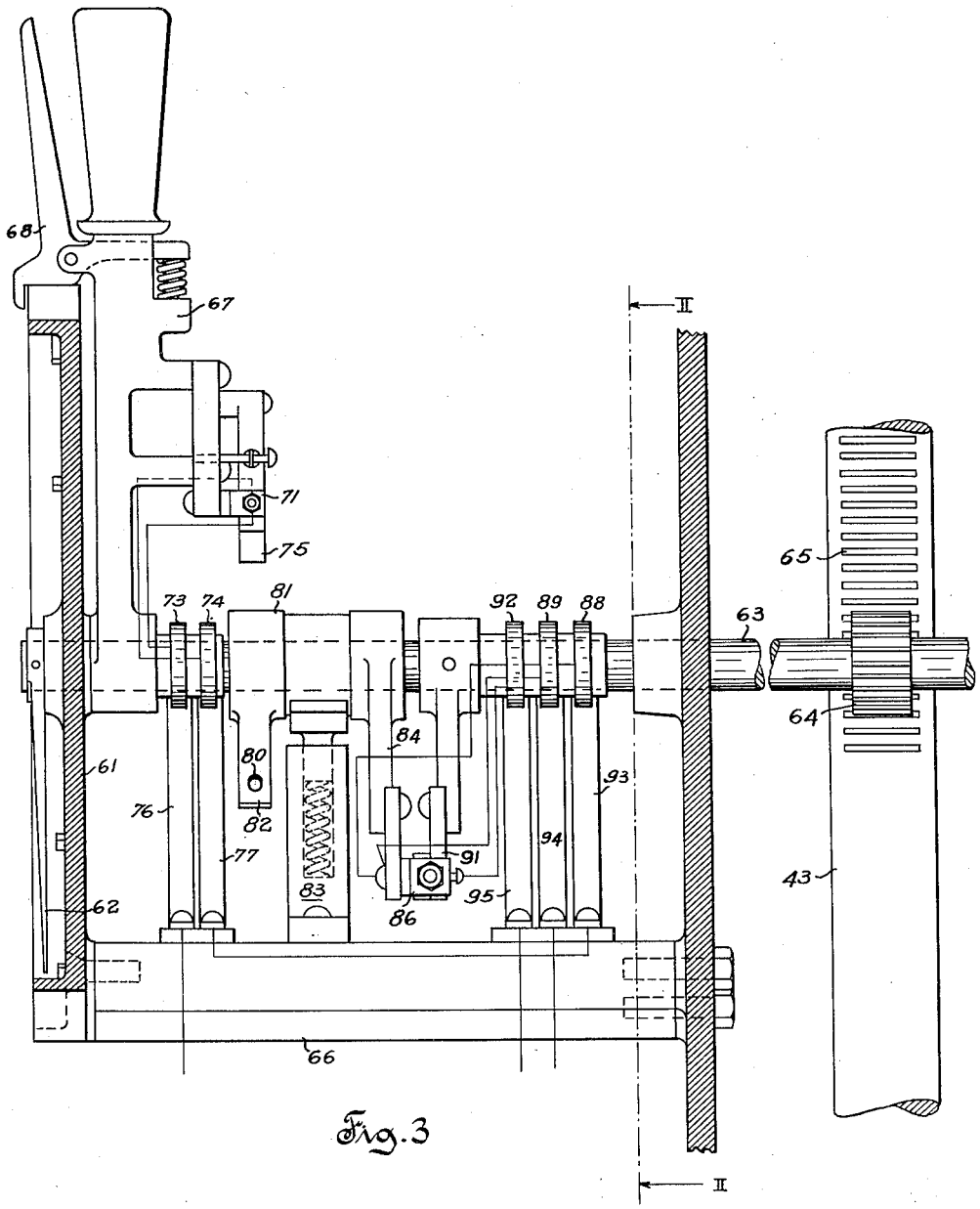

Objects and advantages other than those above set forth will be apparent from the following description when read in connection with the accompanying drawings, in which:

Fig. 1 is a diagrammatic representation of a prime mover operating an electric current generator and provided with a control system embodying the invention and in which the several elements of the unit and its control system are shown in the standstill position;

Fig. 2 is a vertical sectional view taken on the plane II—II of Fig. 3, of a portion of the control system, not shown in Fig. 1, and therefore shown in enlarged detail in Figs. 2 and 3; and Fig. 3 is an enlarged detail view taken on the plane III—III of Fig. 2 and illustrating all of the levers and the construction of that portion of the control system not disclosed in Fig. 1, in the vertical position for ease in illustrating the same.

Referring more particularly to the drawings by characters of reference, reference numeral 6 generally designates a prime mover herein disclosed as a hydraulic turbine receiving operating fluid under pressure from any suitable source (not shown) through a conduit or penstock 7. The flow of operating fluid through the penstock 7 into the turbine 6 is controlled by means of a gate or valve herein shown as the wicket 8 of a valve of the well known butterfly type. It will, of course, be understood that any prime mover may be employed and that such prime mover may be operated by any fluid and that the operating fluid may be controlled by any type of gate or valve suitable to the type of prime mover and to the operating fluid used. The prime mover 6 is arranged to be connected with a machine to be driven thereby and the shaft 9 of the prime mover is preferably connected with the shaft 11 of an electric current generator 12 which is arranged to be connected with an electric power transmission line 13 having other generators (not shown) connected therewith. The generator 12 is connectible to line 13 by a circuit making and breaking switch 14 having an auxiliary contact 16, the purpose of which will be explained hereinafter.

The gate 8 is pivotally mounted in the conduit 7 and is connected with a bell crank 17 connected with a piston 18 operating in a cylinder 19 and forming a fluid pressure operated servo motor. The ends of the servo motor cylinder on opposite sides of the piston are connected by way of pipes 21 and 22 with a valve generally designated by 23 which valve is connected with a suitable source (not shown) of fluid under pressure by way of a supply pipe 24 and from which the fluid may be discharged by way of a discharge pipe 26. The stem 27 of the valve 23 extends upwardly and is threaded to receive a nut 28 to which is swiveled a floating lever 29. The floating lever 29 is connected intermediate its ends with flyballs 31 of a usual type which are mounted on a pedestal 32. The flyballs are driven by suitable means responsive to the speed of the turbine such as the driving pulley 33 mounted on the shaft 9 and 11 connecting the two machines and a belt 34 running to a pulley mounted on the governor pedestal and not shown in the drawings and connected with a bevel gear 36 which engages a bevel gear 37 driving the spindle by which the flyballs themselves are rotated. It will be understood that increase in the speed of the machine shaft and consequently any increase in the flyball driving speed, produces an expanding action of the flyballs which causes lifting of the floating lever 29 and that a speed decrease of the machine has an opposite action to that above as is well known.

The end, not yet mentioned, of the floating lever 29 is connected pivotally with a nut 41 threaded on a rod 42 which is rotatably mounted within a sleeve 43 as will be hereinafter described. Movement of the swiveling nut 41 toward the end of the rod 42 is limited by a nut 44 which determines the scope of such movement of the swivel. It will be understood of course that movement of the swivel nut 41 is obtained by rotation of the rod 42 as will be explained hereinafter, rather than by movement of the nut 41 itself. The sleeve 43 is movable vertically within a bracket 46 extending from the governor pedestal 32 and is connected by a rod 47 pivotally mounted intermediate the ends of the lever 48 which is pivotally mounted on the governor pedestal at one end and has the other end thereof adjustably connected by a rod 49 with one arm of the bell crank 17.

The position of the swivel nut 41 on the rod 42 may be varied by rotation of the rod by a gear 51 fixedly mounted thereon and meshing with an elongated pinion gear 52 which is driven by a worm wheel 53 and worm 54. The worm 54 is driven either directly or indirectly by an electric motor 56 which may be energized from a suitable source of current such as a battery 57. The circuit to the motor is partially controlled by the auxiliary contact 16 of the circuit breaker 14 and by a manually operable switch 58 in that the motor circuit can not be completed unless the circuit breaker is in closed position and unless the hand switch is closed as will be described hereinafter. The speed of operation of the motor 56 which is of the direct current reversible type is controlled by means of a rheostat 59 which may be adjusted to secure any desired speed of rotation of the motor.

A dial 61, suitably marked, to indicate the degree of opening of gate 8, is mounted on the pedestal bracket 46 and is provided with a pointer 62 mounted on a spindle 63 which is rotated by a pinion 64 meshing with a rack 65 (partially shown in Fig. 3) formed on the sleeve 43 previously mentioned. As will appear more clearly hereinafter from the explanation of the operation of the governing system herein disclosed, the vertical movement of the sleeve 43 is dependent on the movement of the gate 8 and movement of the pointer 62 therefore indicates the degree of opening of such gate. As will be seen by reference to Figs. 2 and 3 of the drawings, the dial 61 is spaced from the bracket 46 by a spacer 66 thus providing a space back of the dial for adjustably mounting a control lever 67 on the spindle 63, which control lever is provided with a latch 68 engaging the rim of the dial to retain such lever in any desired position. The lever 67 carries an adjustable fixed contact member 71 and a movable contact member 72 biased to engage contact 71. The contact members are connected respectively with slip rings 73 and 74 likewise mounted on and movable with the lever 67. The slip rings have severally contacting thereon brushes 76 and 77 which are mounted on the dial spacer 66 and form a portion of an electric circuit to the motor 56, which circuit is to be described hereinafter.

The spindle 63 also has loosely mounted thereon a sleeve 81 from which projects an extension 82 having an adjustable screw extending therefrom and arranged to come into contact with the movable contact 72 on the contact lever 67 when the device is operated as will be described to thereby open the circuit at the contacts 71, 72. Rotation of the sleeve 81 is retarded and limited by a friction brake or brake of some character generally designated at 83. The sleeve is also provided with an extension 84 which carries contacts 86 and 87 connected respectively with the slip rings 88 and 89. The electric circuit is opened and closed at the contacts 86 and 87 by a contact 91 keyed on the dial pointer spindle 63 and therefore rotating therewith. The contact 91 is connected with a slip ring 92 and the slip rings 88, 89 and 92 are mounted to rotate with the contact member 91 and are severally engaged by the brushes 93, 94 and 95 which are mounted on the dial spacer member 66. It will be understood that the several contacts, the slip rings and the other portions of the structure are suitably insulated from each other as is well known in the art and therefore not herein described.

Assuming that the turbine 6 is at standstill and that the generator 12 is disconnected from the line 13, the several portions of the system will be in the position shown, that is the gate 8 is closed, the circuit breaker 14 is open and the switch 58 is in the neutral position. The several portions of the governing system then are also in the position shown with the valve 23 in the neutral position and the piston 18 in its extreme left hand position in the cylinder 19. The contact structure operated by the indicator spindle 63 is then inoperative even though the contacts 87 and 91 are in engagement as is shown in Fig. 2. The turbine 6 is started by momentarily closing the switch 58 to energize the motor 56 for rotation in a direction which will open the gate 8. Such rotation of the motor 56 raises the swivel nut 41 which, the flyballs 31 still being at rest, depresses the valve 23 and admits pressure on the left hand face of the servo motor piston 18 which opens the gate 8 to admit operating fluid to the turbine 6 which then commences to rotate. Rotation of the turbine 6 causes rotation of the flyballs 31 which expand to lift the floating lever 29 which tends to restore the valve 23 to its neutral position and thus tends to keep the then attained speed of the turbine 6 constant. Opening the gate 8 however pulls the rod 49, the lever 48 and rod 47 down which downward movement causes downward movement of the sleeve 43 and causes spindle 63 and pointer 62 connected therewith to rotate in counter-clockwise direction. Such rotation of spindle 63 moves contact 91 away from the contact 87, against the action of the brake 83, and into contact with the contact member 86. Such action is however without effect on the motor 56 because the auxiliary contact 16 of the circuit breaker 14 is still open and keeps the contacts 86, 87 and 91 inoperative. Further movement of the spindle 63 and hence of the contact 91 merely causes the contact 91 to push the contact 87 ahead of the contact 91 against the action of the brake 83. Momentary closure of the switch 58 is repeated until the turbine is up to synchronous speed whereupon the generator 12 is excited and the circuit breaker 14 is closed which closes the auxiliary contact 16 thereof and makes circuit control by the contacts 86, 87 and 91 operative. To avoid undesirable movement of the valve 23 by operation of the motor 56, when the unit is operating at the normal speed therefor, switch 56 may be reversed to cause opening of the circuit energizing the motor 56 to cause a slight movement thereof in the direction for closing of gate 8 which causes movement of spindle 63 in the clockwise direction and hence moves contact 91 away from 87. The contact 91 can then be allowed to remain in a position intermediate contacts 86 and 87.

When the unit is required to supply the line 13 with power and hence operates as a generator under load, an increase in the speed of the turbine 6 causes the flyballs 31 to expand which lifts the floating lever 29 and also lifts the valve 23. Such lifting of the valve 23 allows discharge of the fluid under pressure from the left hand portion of the servo motor cylinder 19 and admits fluid pressure into the right hand portion of the servo motor cylinder 19 thus moving the piston 18 in the direction to commence closing of the gate 8. Closing movement of the gate 8 lifts the rod 49, the lever 48 and the rod 47 and sleeve 43 which rotates the indicator spindle 63 in a clockwise direction. Contact 91 is therefore brought into contact with the contact member 87 which closes a circuit to the motor 56 to cause operation thereof in a direction for closing of the gate 8. Such rotation of the motor 56 moves the swivel nut 41 down along the rod 42. Continuous movement of the floating lever 29 is hence the result of the additive effect of the upward movement of the flyballs 31 and the downward movement of the swivel nut 41 and such effect lifts the valve 23 to continue the closing movement of the gate 8. Such closing action of the gate 8, being produced independently of the action of the speed responsive means 31, should proceed until the gate is again completely closed. If the frequency and hence the speed is then caused to decrease, such decrease will act on the flyballs 31 to cause interruption of the closing movement of gate 8.

Upon the occurrence of such speed decrease due to closing of the gate 8 beyond the point required to correspond to normal speed of the power line, closing the gate 8 will cause the rod 49, lever 48 and rod 47 to move upwardly which lifts the sleeve 43. Such speed decrease also causes the flyballs 31 to contract which pulls the floating lever 29 down. The continued downward movement of the swivel nut 41 and the downward movement of the floating lever 29 due to the action of the flyballs thereon is now subtractive and depresses the valve 23 to cause opening of the gate 8. Such action of the gate 8 again causes counter-clockwise movement of the indicator spindle 63 which moves the contact 91 away from the contact 87 to interrupt energization of the motor 56 in its operation in the gate closing direction. The gate 8 therefore opens only very slightly and such slight movement cooperates with the flyballs to return the valve 23 to the neutral position where the normal speed of the turbine is maintained.

If a speed increase in the power line takes place and must be corrected, the above actions are repeated but the sequence in which such actions takes place will be different from that given above as will be well understood in the art.

If a unit is paralleled to the power line but is not required to aid in supplying power to the line 13 but is to be kept in instant readiness to be put under load, the generator must be operated as a synchronous condenser. During such operation as a synchronous condenser, the gate 8 may remain closed to conserve the operating fluid and to avoid wasting power in the operation of the unit. Under such conditions the unit is again brought up to speed as was previously described. The circuit breaker 14 is kept closed and switch 58 is then closed to energize the motor 56 for operation in the direction for closing the gate 8. Swivel nut 41 is therefore caused to move down and, the speed being yet maintained and the flyballs 31 hence remaining in the position previously described, the floating lever 29 is tilted to move the valve 23 upwardly which causes discharge of pressure from the left hand end of the servo motor cylinder 19 and admits pressure to the right hand end thereof to cause closing of the gate 8. The sleeve 43 then is actuated to cause movement of valve 23 into the neutral position and the gate 8 remains closed. During such closing movement of the gate 8, the contacts 87 and 91 also remain in engagement with each other. The unit therefore now acts as a synchronous condenser and is in instant readiness for supplying current to the line 13 if the electrical frequency of such line should decrease below the value to be maintained therein.

If the electrical frequency of the line 13 decreases, the speed of the turbine-generator unit decreases. The speed at which the flyballs 31 are driven therefore also decreases and the flyballs contract thereby pulling down on the floating lever 29 which, there being as yet no movement of the motor 56, depresses the valve 23 causing the gate 8 to open to admit operating fluid to the turbine. Such opening of the gate 8 causes counter-clockwise rotation of the indicator spindle 63 which separates the contacts 87 and 91 and causes engagement of the contacts 86 and 91. The motor 56 is then energized to move the swivel nut 41 upwardly along the rod 42 which added to the downward movement of the floating lever 29 due to the contraction of the flyballs 31, keeps the valve 23 in the downward position and causes the gate 8 to be opened farther until the speed of the unit rises. As the speed of the unit rises, the flyballs 31 expand and lift the floating lever 29 which tends to close the valve 23. But the swivel 41 is still rising due to the action of the motor 56 at a rate to lift the floating lever 29 faster than such lever can be lowered by the subtractive action of the flyballs 31. Such subtractive action of the motor 26 and the flyballs 31 on the floating lever 29 keeps the valve 23 in its depressed position to keep the gate 8 moving in the opening direction. Such opening action of the gate 8 causes lifting of the sleeve 43 and hence causes rotation of the indicator spindle 63 in a counter-clockwise direction until the extension 82 being rotated by the spindle 63, engages contact 72 and thereby opens the circuit of the motor 56. The swivel nut 41 then ceases to rise and the expansion of flyballs 31 with the action of the sleeve 43 and its connections added thereto returns the valve 23 to the neutral position to retain the gate 8 in the position it has then reached. The speed of the unit and of the power line then continues to increase until the desired value has been reached. Any speed increase beyond the desired point is checked by closure of the gate 8 as previously described under operation of the governor when the unit is delivering power to the line 13.

If the unit is paralleled with a large power line and if the output of such unit is a relatively small portion of the total system output, it is evident the small increase added to the system by such unit can cause only a slight and gradual change in the frequency of the system. The output demand from such unit thus depends on the amount of output of the unit.

It will be understood from the above description that the invention may be applied to any type of prime mover to which the flow of operating fluid is controlled by a gate or valve of any description. When the operating fluid is under pressure, the pilot valve and the servo motor form power operated means for operating such gate and therefore relieve the control system of the necessity for providing the power to produce such gate action. The flyball structure with its drive which may be either electrical or mechanical as shown, provides speed responsive means acting on the pilot valve and the linkage of the gate with the floating lever thus causing the sleeve to cooperate with the flyballs to control the operation of the pilot valve. The motor for adjustment of the connections of the floating lever with the gate provides means for modifying or varying the action of the speed responsive flyballs on the floating lever and hence on the pilot valve. Operation of the motor is controllable at all times and in either direction by the hand switch while the gate indicator operated contacts control operation of the motor and limit such operation only after the circuit breaker is closed to make such contacts operative. The other functions of the various elements of the system considered severally and their functions considered jointly will be apparent from description of operation of the system hereinabove and need not be further explained.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In a system for controlling the operation of an electric current generator driven by a prime mover and adapted to be connected with a power transmission line in parallel with other generators, a circuit breaker having an auxiliary contact and controlling connection of the generator with the line, a gate controlling flow of operating fluid to the prime mover, means for operating said gate, means responsive to the speed of the prime mover for controlling the operation of the first said means, and means for modifying the effect of said speed responsive means dependent on the position of said gate, the auxiliary contact of said circuit breaker being effective in one position thereof to render the last said means wholly inoperative.

2. In a system for controlling the operation of an electric current generator driven by a prime mover and adapted to be connected with a power transmission line in parallel with other generators, a gate controlling the flow of operating fluid to the prime mover, means for operating said gate, means responsive to the speed of the prime mover for controlling the operation of the first said means, means for modifying the effect of said speed responsive means dependent on the position of said gate, and independently of the effect of said speed responsive means and manually operable means for controlling the third said means.

3. In a system for controlling the operation of an electric current generator driven by a prime mover and adapted to be connected with a power transmission line in parallel with other generators, a circuit breaker controlling connection of the generator with the line and having an auxiliary contact, a gate controlling flow of operating fluid to the prime mover, means for operating said gate, means responsive to the speed of the prime mover for controlling the operation of the first said means, electric motor operated means for varying the operation of said speed responsive means, means connected with said gate for indicating the positions thereof, means operated by said indicating means for controlling the operation of said motor operated means, the auxiliary contact of said circuit breaker being effective in one position thereof to control operation of the fifth said means, and a manually operable switch for controlling said motor operated means regardless of the position of said circuit breaker.

4. In a system for controlling the operation of an electric current generator driven by a prime mover and adapted to be connected with a power transmission line in parallel with other generators, a circuit breaker having an auxiliary contact and controlling connection of the generator with the line, a gate controlling the flow of operating fluid to the prime mover, means for operating said gate, means responsive to the speed of the prime mover for controlling the operation of said gate operating means, means for controlling the effect of said speed responsive means, an electric motor for operating the third said means, and gate operated means for controlling the operation of said motor, the auxiliary contact of said circuit breaker being effective in one position thereof to render said gate operated means wholly ineffective.

5. In a system for controlling the operation of an electric current generator driven by a prime mover and adapted to be connected with a power transmission line in parallel with other generators, a gate controlling the flow of operating fluid to the prime mover, means for operating said gate, means responsive to the speed of the prime mover for controlling the operation of said gate operating means, means for controlling the effect of said speed responsive means, an electric motor for operating the third said means, gate operated means for controlling the operation of said motor, and a manually operable switch for overcoming the operation of said gate operated means and for independently controlling the operation of said motor.

6. In a system for controlling the operation of an electric current generator driven by a prime mover and adapted to be connected with a power transmission line in parallel with other generators, a gate controlling the flow of operating fluid to the prime mover, means for operating said gate, means responsive to the speed of the prime mover for controlling the operation of said gate operating means, means connected with said gate for indicating the position thereof, means for varying the operation of said speed responsive means, and means operated by said indicating means for controlling the operation of the fourth of said means.

7. In a system for controlling the operation of an electric current generator driven by a prime mover and adapted to be connected with a power transmission line in parallel with other generators, a circuit breaker having an auxiliary contact and controlling connection of the generator with the line, a gate controlling the flow of operating fluid to the prime mover, means for operating said gate, means responsive to the speed of the prime mover for controlling the operation of said gate operating means, means connected with said gate for indicating the position thereof, means for varying the operation of said speed responsive means, means operated by said indicating means when controlling the operation of the fourth said means, the auxiliary contact of said circuit breaker being effective in one position thereof to render the last of said means inoperative.

8. In a system for controlling the operation of an electric current generator driven by a prime mover and adapted to be connected with a power transmission line in parallel with other generators, a gate controlling the flow of operating fluid to the prime mover, a fluid pressure operated servo motor for operating said gate, a valve controlling the supply of fluid pressure to said servo motor, means responsive to the speed of the prime mover for controlling the operation of said valve, means connected with said gate for indicating the position thereof, means for varying the operation of said speed responsive means, and means operated by said indicating means for controlling the operation of the third said means.

9. In a system for controlling the operation of an electric current generator driven by a prime mover and adapted to be connected with a power transmission line in parallel with other generators, a gate controlling the flow of operating fluid to the prime mover, a fluid pressure operated servo motor for operating said gate, a valve controlling the supply of fluid pressure to said servo motor, means responsive to the speed of the prime mover, means for varying the effect of said speed responsive means, means connected with said gate for indicating the position thereof, and means operated by said indicating means to control the operation of the second said means, the first and the second said means cooperating to control the operation of said valve.

10. In a system for controlling the operation of an electric current generator driven by a prime mover and adapted to be connected with a power transmission line in parallel with other generators, a gate controlling the flow of operating fluid to the prime mover, means for operating said gate, means responsive to the speed of the prime mover for controlling the operation of said gate operating means, means connected with and operable to vary the effect of said speed responsive means, an electric motor operable to vary the connection of the third said means with said speed responsive means, and contact means operable dependent on the position of said gate to control the operation of said motor and operable only upon connection of the generator with the power line.

11. In a system for controlling the operation of an electric current generator driven by a prime mover and adapted to be connected with a power transmission line in parallel with other generators, a gate controlling the flow of operating fluid to the prime mover, means for operating said gate, a floating lever controlling the action of said gate operating means, means responsive to the speed of the prime mover and connected with said lever, means operable dependent on the position of said gate and connected with said lever, the last two said means cooperating to control the movement of said lever, and manually operable means superseding the action of said gate on the third said means to control the action of said gate operating means.

12. A system for controlling the operation of an electric current generator to be connected with and to aid in supplying electric current to a power line, a circuit breaker having an auxiliary contact and arranged to connect the generator with the power line, a prime mover for driving the generator, a gate controlling the flow of operating fluid to said prime mover, a valve controlled fluid pressure operated means for operating said gate, a flyball structure connected with said valve for controlling the operation thereof, means connecting said gate with said flyballs, an indicator operated by said means to indicate the position of said gate, a reversible motor connected with said means and with said flyballs to vary the operation thereof, a plurality of contacts operated by said indicator for controlling the operation of said motor in either direction and for limiting the operation of said motor in one direction, the auxiliary contact of said circuit breaker in one position being adjusted to make said plurality of contacts inoperative, and a manually operated switch for controlling said motor regardless of the position of said circuit breaker or of said plurality of contacts.

13. A system for controlling the operation of an electric current generator to be connected with and to aid in supplying electric current to a power line, a circuit breaker having an auxiliary contact and arranged to connect the generator with the power line, a prime mover for driving the generator, a gate controlling the flow of operating fluid to said prime mover, a fluid pressure operated servo motor for operating said gate, a valve controlling the supply of pressure to said servo motor, a flyball structure connected with said valve for controlling the operation thereof, means connecting said gate with said flyballs, an indicator operated by said means to indicate the position of said gate, a reversible motor connected with said means and with said flyballs to vary the operation thereof, a plurality of contacts operated by said indicator for controlling the operation of said motor in either direction of rotation, a contact operated by said indicator for limiting the rotation of said motor in one direction, the auxiliary contact of said circuit breaker in one position thereof being adapted to make said plurality of contacts inoperative, and a manually operated switch for controlling said motor regardless of the position of said circuit breaker or of said plurality of contacts.

ARNOLD PFAU.